United States Patent [19]

Brown

[11] Patent Number: 5,033,833
[45] Date of Patent: Jul. 23, 1991

[54] OMNI-DIRECTIONAL OPTICAL ANTENNA ELEMENT

[75] Inventor: William C. Brown, Littleton, Colo.

[73] Assignee: Martin Marietta Corporation, Bethesda, Md.

[21] Appl. No.: 485,276

[22] Filed: Feb. 26, 1990

[51] Int. Cl.$^5$ .................. G02B 13/06; G02B 17/00
[52] U.S. Cl. .................... 350/443; 350/441; 350/442; 350/445
[58] Field of Search ............ 350/540, 541, 542, 441, 350/442, 443, 445, 435, 523, 174, 619, 620, 421, 168; 362/62, 259, 299, 302, 308, 327, 328, 347, 363; 455/600, 609; 128/6; 358/87

[56] References Cited

U.S. PATENT DOCUMENTS

| | | | |
|---|---|---|---|
| 1,589,370 | 6/1926 | Conover | 362/363 |
| 1,657,502 | 1/1928 | Harrman | 362/363 |
| 2,244,235 | 6/1941 | Ayres | 350/441 |
| 3,404,934 | 10/1968 | Brachvogel | 128/6 X |
| 3,662,165 | 5/1972 | Osteen et al. | 240/103 R |
| 3,828,185 | 8/1974 | Vandling | 250/199 |
| 3,953,131 | 4/1976 | Britz | 356/141 |
| 4,012,126 | 3/1977 | Rosendahl et al. | 350/443 X |
| 4,134,007 | 1/1979 | Koreicho et al. | 250/199 |
| 4,161,770 | 7/1979 | Maurer | 362/309 |
| 4,214,807 | 7/1980 | Gfeller | 350/3.73 |
| 4,309,746 | 1/1982 | Rushworth | 362/259 |
| 4,662,726 | 5/1987 | Rines et al. | 350/444 |

FOREIGN PATENT DOCUMENTS

| | | | |
|---|---|---|---|
| 878162 | 8/1971 | Canada | 350/441 |
| 23084 | 5/1962 | German Democratic Rep. | 350/442 |
| 444524 | 2/1968 | Switzerland | 350/441 |
| 15188 | of 1908 | United Kingdom | 350/443 |
| 1155544 | 6/1969 | United Kingdom | 350/441 |

OTHER PUBLICATIONS

Hect, Eugene and Zajac, Alfred, *Optics*, Addison-Wesley 1989, p. 120.

*Primary Examiner*—Bruce Y. Arnold
*Assistant Examiner*—David R. Parsons
*Attorney, Agent, or Firm*—Dorr, Carson, Sloan & Peterson

[57] ABSTRACT

An omni-directional antenna for use with light or other electromagnetic radiation has a surface extending outward from a central axis. The surface can be either radially symmetrical or asymmetrical. A portion of the surface adjacent to the axis is substantially transmissive and the remainder of the surface is substantially reflective. The reflective portion of the surface curves radially outward from the transmissive portion. The shapes and sizes of the transmissive and reflective portions of the surface are fixed such that upwardly directed rays striking the surface of the device parallel to the axis will be refracted by the transmissive portion and/or reflected by the reflective portion of the surface into a substantially omni-directional output pattern, when the device is used as a transmitter. Conversely, when used as a receiving antenna, rays striking the transmissive portion of the surface will be refracted and rays striking the reflective portion will be reflected into a downwardly directed output pattern substantially parallel to the axis.

21 Claims, 8 Drawing Sheets

ANGLE (DEGREES) WITH RESPECT TO SYMMETRY AXIS

Fig. 14
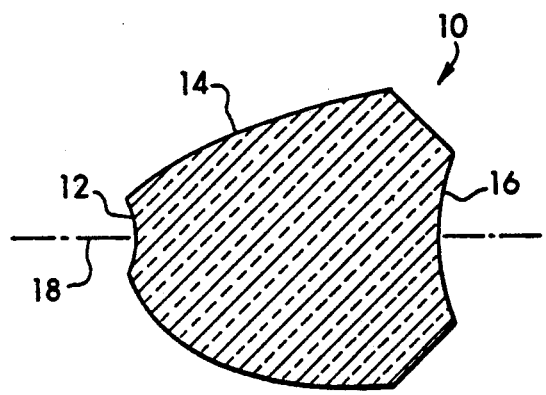
Fig. 15
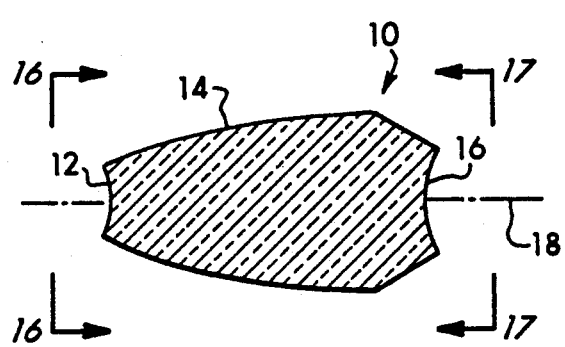
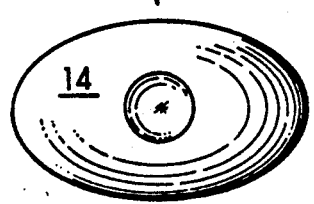
Fig. 16
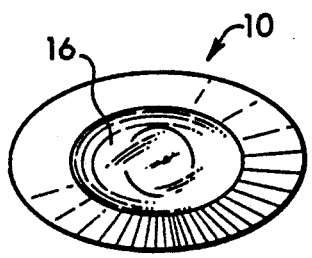
Fig. 17

OMNI-DIRECTIONAL OPTICAL ANTENNA ELEMENT

BACKGROUND OF THE INVENTION

1. Field of the Invention

The present invention relates generally to the field of antennas used to receive and transmit light or other forms of electromagnetic energy. More specifically, the present invention relates to optical elements that can be used either to transmit or receive light in a substantially omni-directional pattern, and thereby act as an omni-directional antenna. The invention also can be used as a directional antenna or as an imager over wide fields of view.

2. Statement of the Problem

One of the greatest technical challenges of operating an orbiting spacecraft, such as the shuttle or the proposed space station, is communications with free-flying entities in the proximity of the spacecraft. Conventional radio frequency bands are either congested or unavailable due to prior allocations. A laser communications system is ideal for this application, provided the usual pointing and tracking requirements caused by the tight, collimated output beam can be relaxed. One approach to avoid this problem is to distribute the laser beam over a large volume of space by means of a wide angle lens or a fish-eye lens. Unfortunately, these types of lenses are heavy and cumbersome and, generally are limited to hemispherical coverage, and consequently are not practical for light, mobile transceivers necessary for space or other applications.

A number of devices and processes have been invented in the past relating to optical devices used to convert a collimated or diverging light beam into a near omni-directional pattern, including the following:

| Inventor | Pat. No. | Issue Date |
|---|---|---|
| Conover | 1,589,370 | June 22, 1926 |
| Harrman | 1,657,502 | Jan. 31, 1928 |
| Osteen, et al. | 3,662,165 | May 9, 1972 |
| Vandling | 3,828,185 | Aug. 6, 1974 |
| Britz | 3,953,131 | Apr. 27, 1976 |
| Koreicho, et al. | 4,134,007 | Jan. 9, 1979 |
| Maurer | 4,161,770 | July 17, 1979 |
| Gfeller, et al. | 4,214,807 | July 29, 1980 |
| Rushworth | 4,309,746 | Jan. 5, 1982 |

Britz discloses an opto-electronic antenna system in which an array of discrete antenna elements 11 are disposed over a hemispherical surface. Each of the antenna elements are connected by light conductors 2 to a beam splitter 3 disposed in the path of a transmitting laser 4 and an optical detector 5. The laser 4 is energized by a signal form the control circuit 6. The output of the laser 4 is transmitted by light conductors 2 to each of the antenna elements 11 for radiation into space. Similarly, radiation which is received by the antenna elements 11 is transmitted by the light conductors 2 through the beam splitter 3 to the detector 5.

Rushworth discloses an electromagnetic radiation diffuser comprising a hollow spherical body 10 having an output window or emission surface 12. The interior surface of the body 10 is coated with a highly reflective diffusion material. The reflective diffusion material serves to transform energy emanating from a source of electromagnetic radiation into a uniform distribution of diffuse radiation within the body 10.

Harrman discloses a headlight having a reflector 7, a hemispherical lens 13, and a concave-convex lens 23. The concave-convex lens 23 has its posterior concavity greater than its anterior convexity so as to deflect rays of light throughout the entire area of the hemispherical lens 13. The lens 13 and reflector 7 combination create a floodlight that is capable of illuminating objects located laterally of the headlight.

Koreicho, et al., disclose a near infrared transmission system for use on an aircraft carrier deck, comprising four optical transmitters or beacons 10, a series of electroluminescent diodes 11, and a parabolic mirror 12. The beam bearing angle from each beacon 10 is approximately 100 degrees. Since the emission from each diode 11 is incoherent, their beams add to each other without interference.

Maurer discloses a guide signal device for use in airport runways, having a prism 1, a housing 2, a reflector 3, and a light source 32.

Osteen discloses an industrial luminaire having a dome-shaped reflector with a number of vertically elongated facets with convex reflecting surfaces to reflect light from the light source downward and outward in overlapping patterns.

The remaining references are noted as being of general interest.

3. Solution to the Problem

None of these prior art references show a compact, lightweight optical device having the structure of the present invention, that is capable of serving as an omni-directional transmit and receive antenna for light or other electromagnetic radiation.

SUMMARY OF THE INVENTION

This invention provides an omni-directional optical device with a substantially circular or elliptical cross-section perpendicular to a central axis, having a transmissive concave upper surface extending radially outward from the upper end of the axis; a transparent region extending radially outward from the lower end of the axis; and a curved reflective surface extending radially outward and upward from the transparent region.

A primary object of the present invention is to provide compact lightweight optical device that can be used as an omni-directional optical antenna for optical communications systems, including but not limited to laser communications systems.

Another object of the present invention is to provide an omni-directional optical device with no moving parts that can be used both for transmission and reception by a short-range laser communications system.

Another object of the present invention is to provide a compact, lightweight optical device that can direct an optical beam over a wide field of regard without conventional gimbals.

Another object of the present invention is to provide a compact, lightweight optical device that can image a wide field of view and/or field of regard also without conventional gimbals.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, wherein:

FIG. 14 is a cross-sectional view of another alternative embodiment in which the device has two difference aspherical cross-sections in orthogonal planes extending through the central axis.

FIG. 15 is a second cross-sectional view of the embodiment shown in FIG. 14, in which the device has been rotated by 90 degrees about its central axis from the view shown in FIG. 14.

FIG. 16 is a bottom view of the embodiment shown in FIG. 14.

FIG. 17 is a top view of the embodiment shown in FIG. 14.

DETAILED DESCRIPTION OF THE INVENTION

Figure 1:
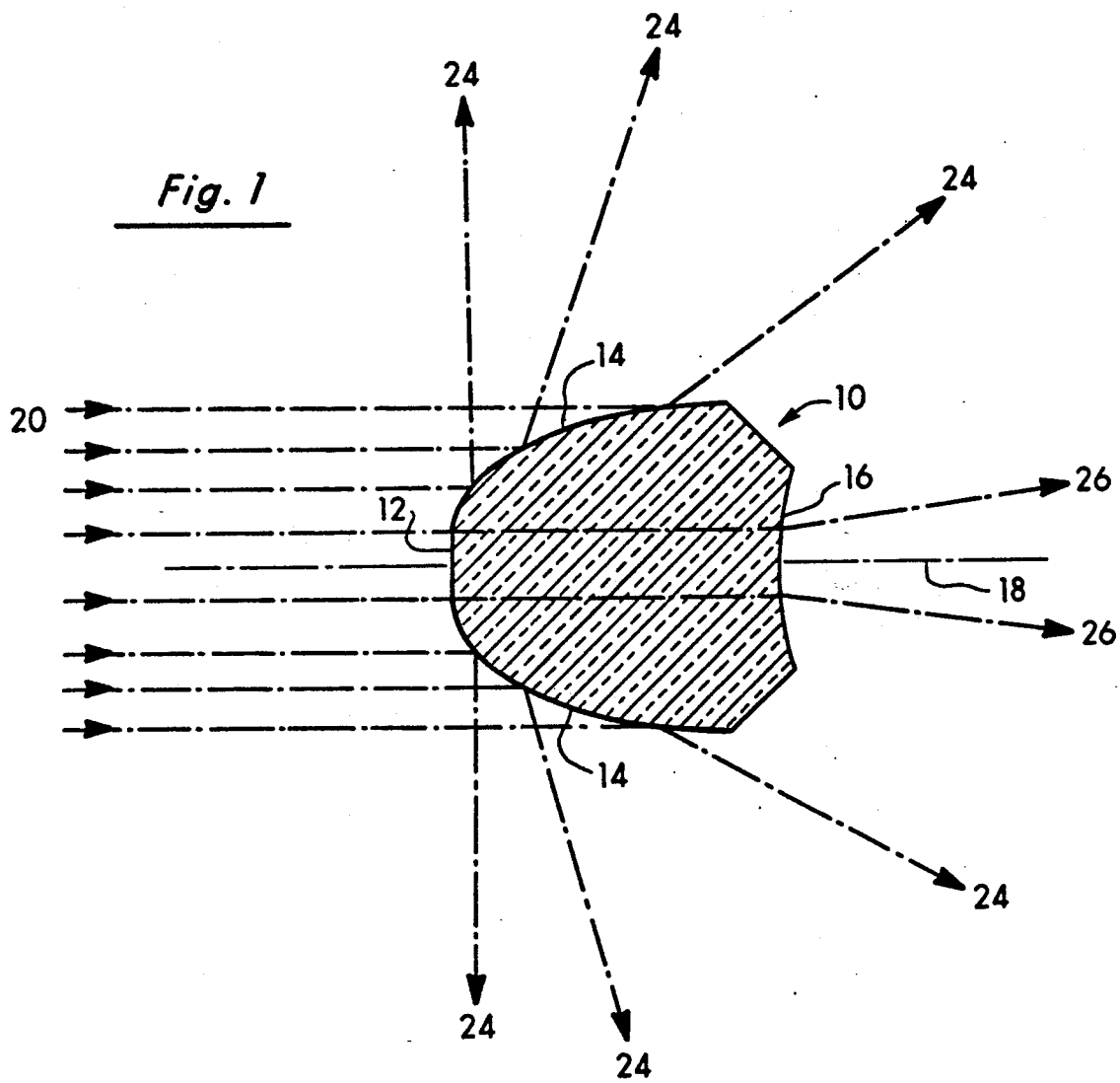
FIG. 1 is a cross-sectional view of a radially symmetrical device.
Figure 2:
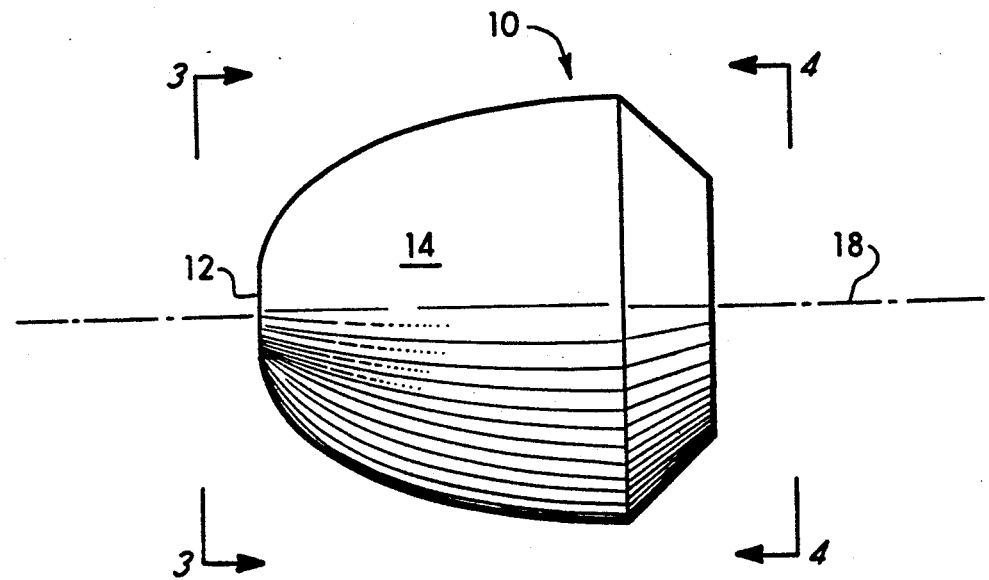
FIG. 2 is a side view of the device shown in FIG. 1.
Figure 3:
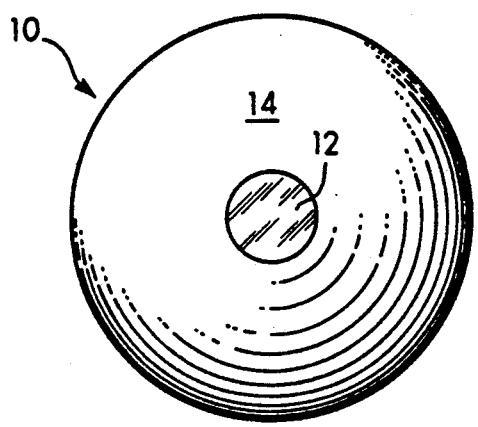
FIG. 3 is a bottom view of the device shown in FIG. 1.
Figure 4:
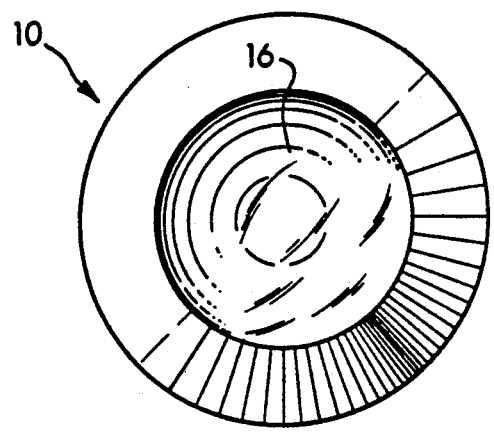
FIG. 4 is a top view of the device shown in FIG. 1.

The radially symmetrical embodiment of the present invention is perhaps best shown in the cross-sectional view provided in FIG. 1. The device 10 is generally radially symmetrical about an axis 18. In the orientation shown in FIG. 1, this axis 18 extends horizontally through the midline of the device 10. FIGS. 2 through 4 show side, bottom, and top views, respectively, of the device 10, corresponding to FIG. 1.

The device 10 typically consists of a transmissive substrate, such as glass or a transparent plastic. A lower transmissive surface 12 extends radially outward from one end of the axis. In the embodiment shown in the drawings, this lower surface is a planar, circular section of the substrate. A curved reflective surface 14 on the surface of the substrate extends radially outward and upward from the lower transmissive surface as shown in FIGS. 1 and 2. This reflective surface can be created by silvering, aluminizing, polishing, or any of a number of other conventional techniques, such as those described by Hect-Zajac, Optics (Addison-Wesley, 1989 ed.) at §5.4, page 120. This radially symmetrical, reflective surface has an asphere of revolution cross-section as shown in FIG. 1. An upper transmissive surface 16 extends radially outward from the other end of the axis. This upper surface 16 has a central concave portion in axial alignment with the lower surface 12, which together with the lower transmissive surface forms a thick lens.

FIG. 1 demonstrates the manner in which the present invention can be used as an optical antenna to transmit and disperse a beam of light 20. Ideally, the diameter of the light beam 20 is approximately equal to the diameter of the device 10. The light beam 20 is parallel to, and centered with the axis 18 of the device 10, such that the beam strikes the lower transmissive surface 12 and the reflective surface 14 of the device. Those rays 26 of the light beam 20 striking the lower transmissive surface 12 pass through the device substrate and are refracted radially outward by the upper concave surface 16 to form a cone of light rays about axis 18. The remaining rays 24 of the light beam 20 striking the reflective surface 14 are reflected and dispersed radially outward in a substantially uniform pattern in all directions, except for the direction of the light beam source and the area illuminated by the cone of refracted light and the light diffracted about the reflective surface. The relative sizes, shapes, and relationships of the optical surfaces of the device are predetermined to provide a cone of refracted rays 26 that is complementary in illuminating the volume of surrounding space that is not illuminated by the reflected rays 24. Thus, the combination of refracted light rays 26 and reflected light rays 24 provide nearly omni-directional dispersion of the collimated light beam 20.

In one embodiment, the transmissive surface 12 is substantially planar. In other embodiments, the reflective surface forms a continuous shape defined by the following equation:

$$r = A \log \cos Bx$$

where r is the radial distance from the symmetry axis 18; x is the linear distance from the vertex of the curve 14 along the symmetry axis 18; and A and B are arbitrary constants resulting in a positive radius, r. For example, A is typically a negative constant, and B is a constant such that $0 \leq Bx < \pi/2$ over the desired range of x.

Figure 5:
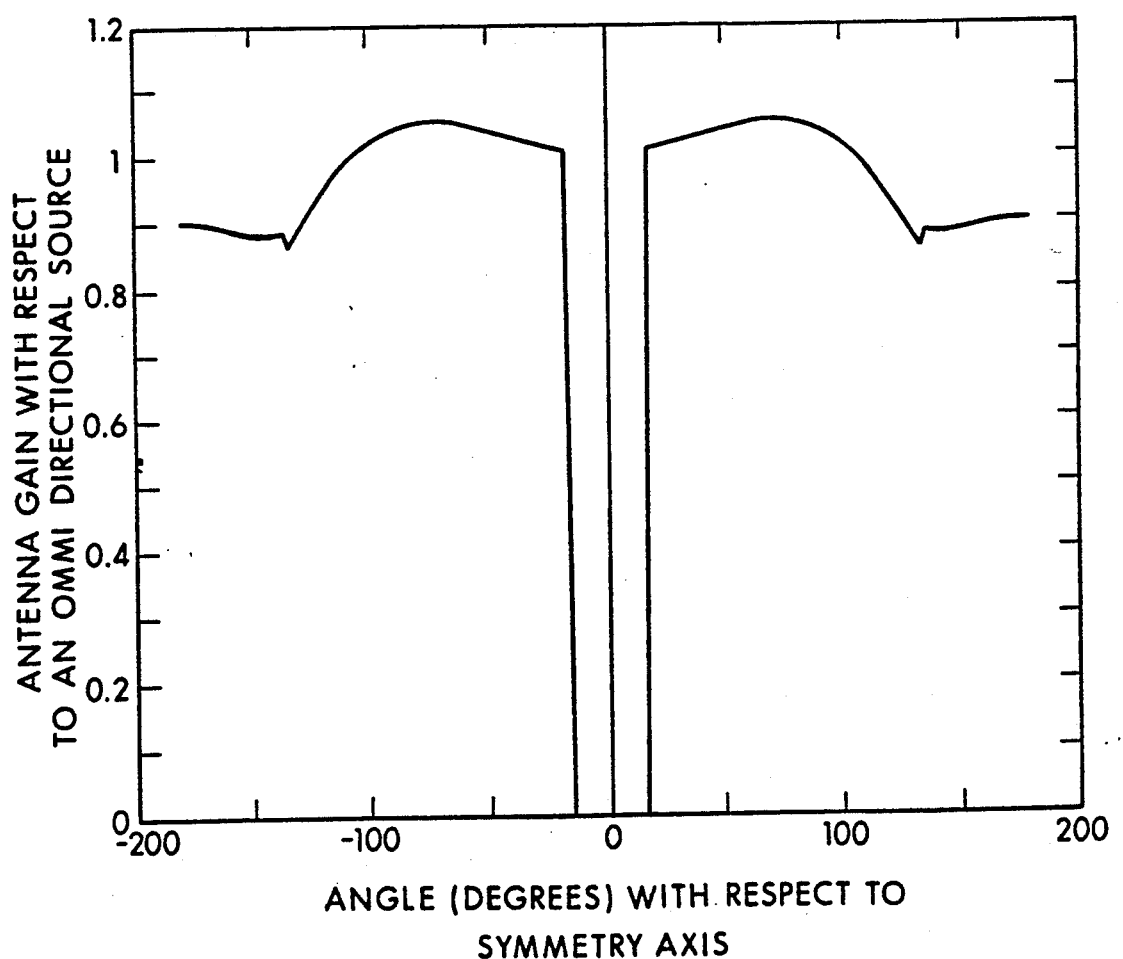
FIG. 5 is a graph showing the transmit antenna gain pattern as a function of the output angle with respect to the axis of symmetry of the device.

FIG. 5 is a representative graph showing the resulting beam distribution of refracted and reflected light as a function of the angle from the axis 18. In this graph, zero degrees represents the direction from which the light came. As can be seen from this graph, the beam intensity remains substantially uniform over a wide range of angles.

The present device can also be used as an omni-directional optical antenna for receiving incoming light. This is demonstrated by simply reversing the direction of the light rays 20, 24 and 26 shown in FIG. 1. Incoming light rays 24 from an external source strike the reflective surface 14 and are reflected toward the bottom of the device as a series of light rays generally travelling in the direction of 20. Similarly, incoming light rays 26 striking the concave upper surface 16 are refracted, pass through the device substrate, and exit the lower transmissive surface 12 as rays generally travelling in the direction of 20.

Figure 6:
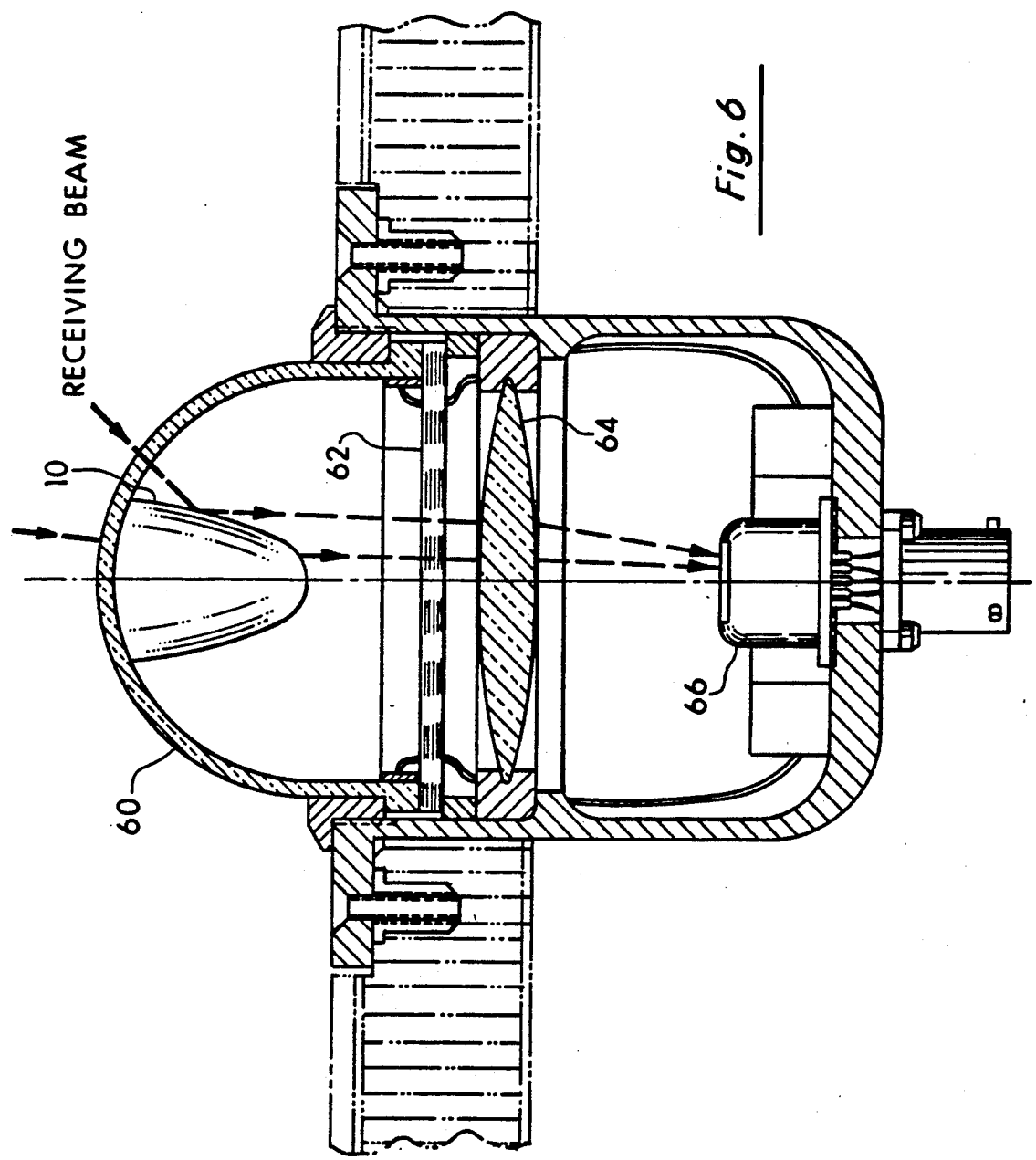
FIG. 6 is a cross-sectional view of one implementation of the device used as a receiving antenna inside a transparent dome.
Figure 7:
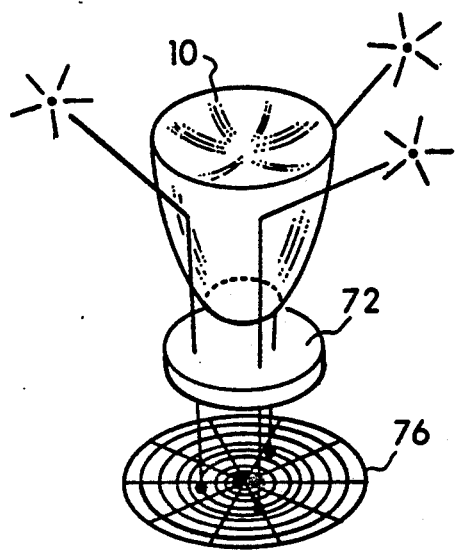
FIG. 7 is simplified perspective view corresponding to FIG. 6, showing how the device can be used to simultaneously track or receive signals from multiple sources.

One embodiment of the present invention as a receiver antenna is shown in FIG. 6. The device 10 is attached to the inside surface of a transparent dome 60. Additional optical elements 62 and 64 are located below the device 10 to provide optical correction of the incoming beam. A photo detector 66 and its related circuitry are located at the bottom of the housing to receive the incoming beam for further processing. In its simplest form, the detector can be used to receive modulated communications signals on the incoming beam. However, a suitable two-dimensional array of photo detectors 76 can be used to also determined the directions of one or more sources, as shown in FIG. 7. A one-to-one correspondence with some overlap exists between each point in the detector array 76 and every direction within the field of view of the device. For example, the incoming beams resulting from three different sources are shown in FIG. 7. Mapping of this one-to-one relationship will depend largely upon the sizes and shapes of the various surfaces of the device. However, this can be accomplished by computer modelling or empirical observation.

Figure 9:
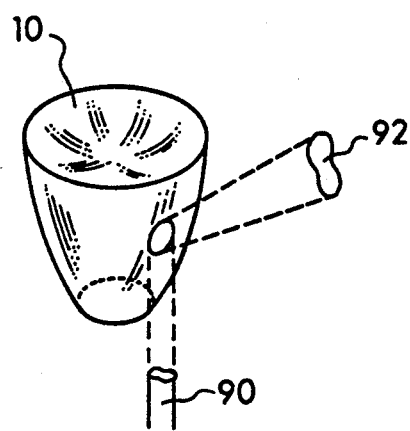
FIGS. 9 and 10 are simplified perspective views corresponding to FIG. 8, showing how the device can be used to direct an output beam anywhere over a large volume of space by a relatively small linear translation of the input beam.
Figure 10:
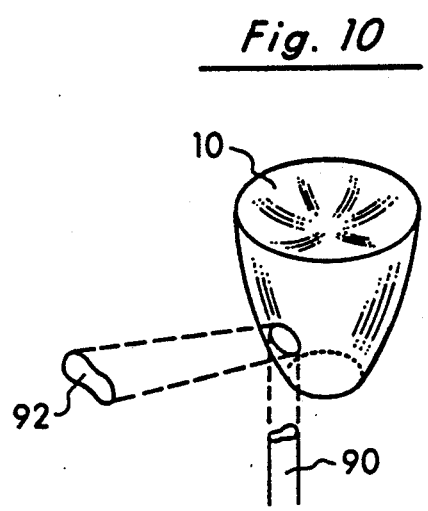
Figure 8:
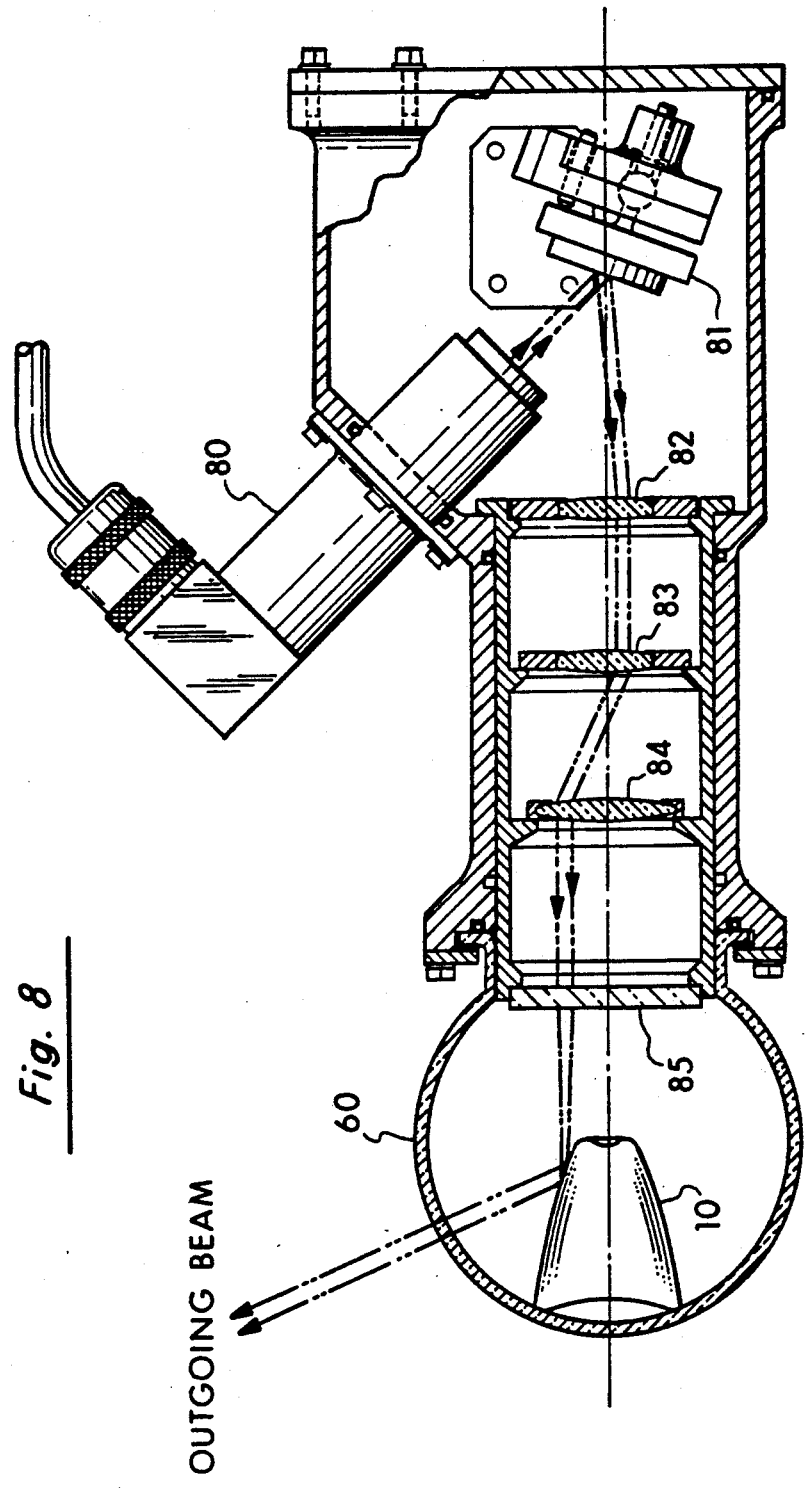
FIG. 8 is a cross-sectional view of one implementation of the device used as a highly directional transmitting antenna for directing a narrow collimated laser beam in arbitrary directions without conventional gimbals.

Configuration of the present invention as a directional transmitting antenna is demonstrated in FIGS. 8-10. In FIG. 8, a laser or other light source 80 directs a light beam onto a steering mirror 81. This mirror is pivotally mounted to rotate in two axes. The precise orientation of the mirror 81 can be controlled by actuators to reflect the light beam from the light source 80 in the desired direction. Additional optical elements 82, 83, 84, and 85 can be employed to provide optical correction of the beam and convert the beam angularly steered by 81 into a beam of light linearly translated on the device 10. The device 10 is secured inside a transparent dome 60, similar to that shown in FIG. 6, to maximize its field of view. As shown in FIGS. 9 and 10, a relatively small translation in the input beam 90 can result in a large change in direction of the outgoing beam 92. Thus, a small change in the orientation of the steering mirror 81 is sufficient to move the outgoing beam over the entire field of view of the device 10. As with the receiving antenna previously discussed in FIGS. 6 and 7, a one-to-one correspondence exists between the location of the input beam 90 and the outgoing beam 92. The necessary mapping function can be determined and programmed into the controller governing the steering mirror 81 to permit the outgoing beam 92 to be steered in any desired direction.

Figure 11:
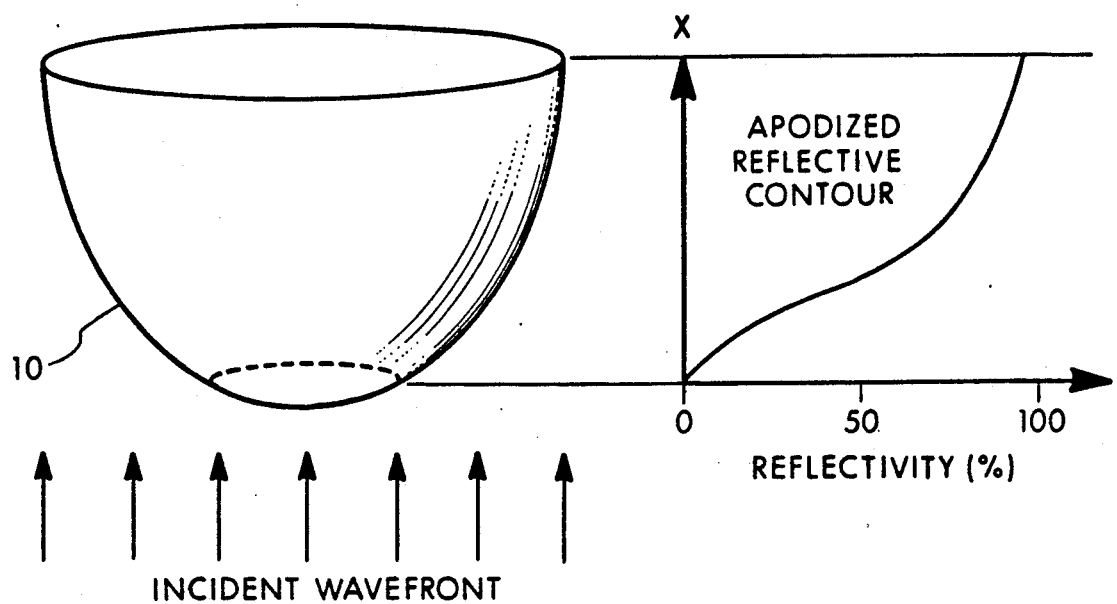
FIG. 11 is an alternative embodiment in which the reflectivity is progressively increased along the surface of the device, instead of having discrete transmissive and reflective regions as shown in FIG. 1.

FIG. 11 shows an alternative embodiment in which the degree of reflectivity is progressively increased outward along the surface of the device 10 (e.g. by means of a graded coating). In other words, the region at the bottom of the device 10 adjacent to the axis is completely transmissive. Reflectivity is gradually and progressively increased as one moves outward and upward along the surface of the device, until a point is reached near the upper end of the device where the surface is completely reflective.

Figure 12:
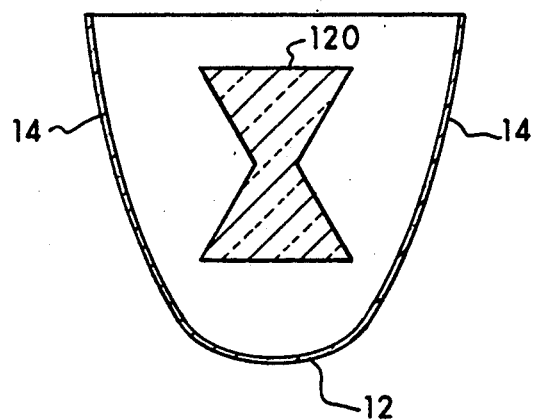
FIG. 12 is a cross-sectional view of an alternative embodiment in which the device is merely a shell. Additional optical elements may be placed in the interior of the shell to correct light rays passing through the transmissive portion of the shell.

The preceding discussion has assumed that the present device consists of a solid substrate. Alternatively, the weight of the device can be substantially reduced by forming the device as a thin shell with a hollow interior. This can be accomplished by conventional optical manufacturing techniques, injection molding, rotational molding, glass molding, or electrolytic replication techniques. FIG. 12 shows one such embodiment in which the transmissive surface 12 and the reflective surface 14 form a thin shell. Additional optical elements, such as a lens 120 or lens combinations, can be placed within the interior of this shell to correct the light rays passing through the transmissive surface 12. In another variation of this embodiment, the lower transmissive surface 12 can be entirely omitted to create an opening into the interior of the device.

The previous discussion has noted that the two transmissive surfaces 12 and 16 act as a refractive optical element in regard to those light rays 26 passing through the central portion of the device. The drawings show an embodiment of the present invention in which the lower surface 12 is substantially planar, and the upper surface 16 is concave. It should be noted that virtually any refractive element or combination of elements such as a negative lens, a positive lens, or compound multi-lens combinations could be substituted for this purpose, provided a cone of refracted light is produced as previously discussed. For example, the lower surface 12 can be concave, and the upper surface can be planar. Alternatively, both surfaces 12 and 16 could be concave or a multi-lens combination could be used.

Figure 13:
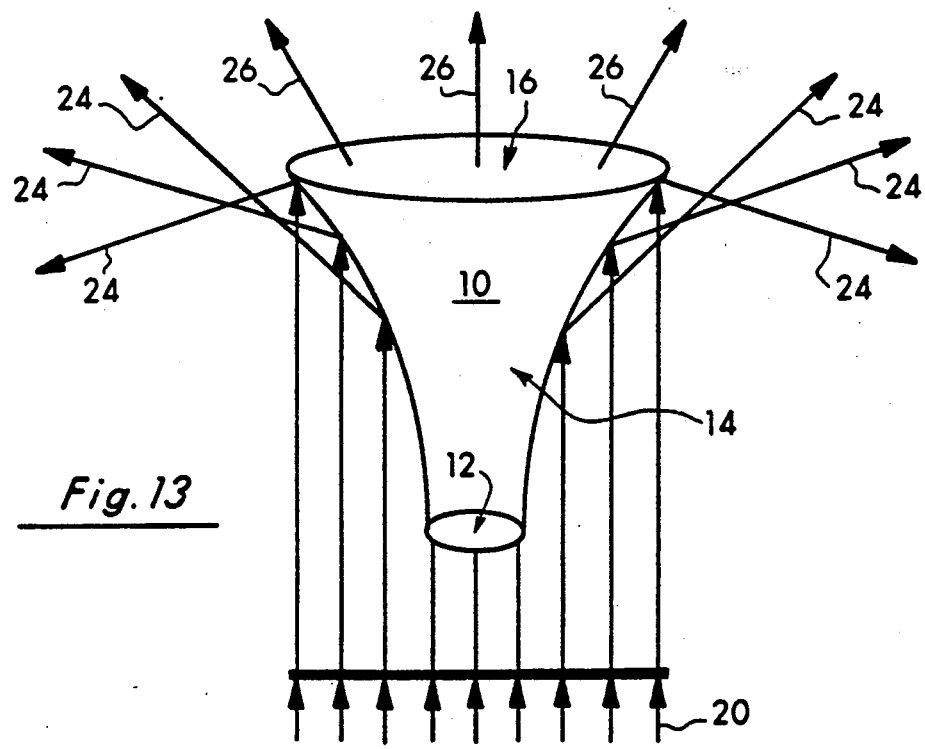
FIG. 13 is an alternative embodiment of the present invention in which the shape of the reflective portion of the surface of the device has been changed to another aspherical form that is more concave.

An additional alternative embodiment is shown in FIGS. 13. The shape of the reflective surface 14 has been inverted in contrast to the embodiment shown in FIG. 1, but still falls within the class of radially symmetrical aspheres. The principle of operation remain the same, but the mapping function between the input beams 20 and the resulting output beams 24 is quite different.

If the device is used with a laser diode having a radially asymmetrical beam, the reflective surface 14 can be designed with two aspherical shapes in two orthogonal planes to simultaneously circularize the incoming beam and to distribute it omni-directionally. In this case, the device is not radially symmetrical, as shown in FIGS. 14 through 17. FIGS. 14 and 15 are cross-sectional views taken along the respective orthogonal planes of the device to show the two distinct aspherical contours of the device. FIG. 15 shows the corresponding bottom view with the lower transmissive surface 12 extending outward about the central axis 18. FIG. 17 is the corresponding top view with the upper transmissive surface 16 extending outward from the upper end of the central axis 18. This upper surface 16 has a central concave portion in axial alignment with the lower transmissive surface 12.

The various embodiments discussed above have potential use in a wide variety of settings. As previously discussed, the device can be used either as a transmitting antenna or receiving antenna in communications systems. When used in an optical communications system, either laser or non-laser sources can be employed. Furthermore, the present invention can be used in association with other types of electromagnetic radiation, and possibly with acoustic energy or accelerated particles.

The present invention can also be used in non-communications applications, particularly where it is necessary to direct a beam of light or other form of energy in a desired direction, or to determine the direction of an incoming beam within a wide field of view or to image a selected segment of the wide field of view. For example, the device can be used for target detection, identification, imaging, and tracking, and in other electronic warfare and countermeasures applications. The device can also be used for navigation and collision avoidance systems, and for local area commercial networks using frequency, coding or spatial modulation techniques. Other non-communications applications include omni-directional illumination and visual imaging, using the device as an ultra wide angle lens with nearly spherical angular coverage.

The above disclosure sets forth a number of embodiments of the present invention. Other arrangements or embodiments, not precisely set forth, could be practiced under the teachings of the present invention and as set forth in the following claims.

I claim:

1. An omni-directional antenna with a longitudinal axis, said antenna comprising:
   (a) a formed, substantially transmissive region extending radially outward from the lower end of said axis; and
   (b) a curved reflective surface extending radially outward and upward from said transmissive region, having radially asymmetrical cross-sections with two distinct aspheres defining the shape of said reflective surface in two orthogonal planes extending through said axis, adapted to reflect and disperse an upwardly-directed beam of electromagnetic radiation striking said reflective surface parallel to said axis in substantially all directions with the exception of the volume of space illuminated by that portion of the beam passing through said transmissive region.

2. The antenna of claim 1 wherein the interior volume defined by said reflective surface is substantially hollow.

3. The antenna of claim 1 wherein said reflective surface defines a continuous thin shell.

4. The antenna of claim 1 further comprising at least one refractive element in axial alignment with said transmissive region.

5. An omni-directional antenna extending about a longitudinal axis, said antenna comprising:
   (a) a substantially transmissive surface extending radially outward from the lower end of said axis; and
   (b) a curved reflective surface extending radially outward and upward from said transmissive surface, adapted to reflect and disperse an upwardly-directed beam of electromagnetic radiation striking said antenna in substantially all directions with the exception of the volume of space illuminated by the portion of the beam transmitted by said transmissive surface, said reflective surface and said transmissive surface having a continuous shape defined by the function: $r = A \log \cos Bx$; where r is the radial distance from said axis, x is the linear distance from the vertex of said function along said axis, A is a negative constant, and B is a constant such that $0 \leq Bx < \pi/2$ over the range of x.

6. The antenna of claim 5 wherein said transmissive surface and said reflective surface are surfaces of a substantially transparent substrate forming the body of said device.

7. The antenna of claim 5 wherein the interior volume defined by said transmissive surface and said reflective surface is substantially hollow.

8. The antenna of claim 5 wherein said transmissive surface and said reflective surface define a continuous thin shell.

9. The antenna of claim 5 further comprising at least one refractive element in axial alignment with said transmissive surface.

10. An omni-directional antenna comprising:
    (a) a substantially transparent substrate extending about a longitudinal axis;
    (b) a transmissive lower surface on said substrate att he lower end of said axis;
    (c) a curved reflective surface around said substrate extending radially outward and upward from said lower surface; and
    (d) an upper surface on said substrate at the upper end of said axis, at least a portion of said upper surface in axial alignment with said lower surface being transmissive.

11. The antenna of claim 10 wherein said lower surface is concave.

12. The antenna of claim 10 wherein said reflective surface has a substantially axially symmetrical, aspherical cross-section in at least one plane passing through said axis.

13. The antenna of claim 10 wherein said antenna is substantially radially symmetrical about said axis.

14. The antenna of claim 10 wherein said reflective surface has a substantially aspherical cross-section extending in a substantially radially symmetrical manner about said axis.

15. The antenna of claim 10 wherein said reflective surface has radially asymmetrical cross-sections with two distinct aspheres defining the shape of said reflective surface in two orthogonal planes extending through said axis.

16. The antenna of claim 10 wherein the portion of said upper surface in axial alignment with said lower surface is concave.

17. The antenna of claim 10 wherein said reflective surface and said transmissive lower surface have a shape defined by the function: $r = A \log \cos Bx$; where r is the radial distance from said axis, x is the linear distance from the vertex of said function along said axis, A is a negative constant, and B is a constant such that $0 \leq Bx < \pi/2$ over the range of x.

18. An omni-directional antenna comprising:
    (a) a substantially transparent substrate that is radially symmetrical about an axis;
    (b) a substantially transmissive lower surface on said substrate at the lower end of said axis;
    (c) a curved, substantially reflective surface around said substrate extending radially outward and upward from said lower surface, adapted to reflect and disperse an upwardly-directed beam of electromagnetic radiation striking said antenna parallel to said axis in substantially all directions with the exception of the volume of space illuminated by that portion of said beam transmitted by said transmissive lower surface; and
    (d) a substantially transmissive upper surface on said substrate extending radially outward from the upper end of said axis, at least the central portion of said upper surface being concave, the concave portion of said upper surface having predetermined dimensions and optical properties such that the portion of said upwardly-directed beam of electromagnetic radiation passing through said lower surface into said substrate is refracted and dispersed by said concave portion in the volume of space above said reflective surface.

19. The antenna of claim 18 wherein said reflective surface has a substantially aspherical cross-section.

20. The antenna of claim 18 wherein said reflective surface and said transmissive lower surface have a shape defined by the function: r=A log cos Bx; where r is the radial distance from said axis, x is the linear distance from the vertex of said function along said axis, A is a negative constant, and B is a constant such that $0 \leq Bx < \pi/2$ over the range of x.

21. An omni-directional antenna comprising:
(a) a transmissive refractive element having a longitudinal axis and upper and lower surfaces, adapted to radially disperse an upwardly-directed light of electromagnetic radiation striking the lower surface of said refractive element;
(b) a curved reflective surface extending radially outward and upward from the periphery of said refractive element, adapted to reflect and disperse an upwardly-directed beam of electromagnetic radiation in substantially all directions with the exception of the volume of space illuminated by said refractive element, said reflective surface and said lower surface having a shape defined by the function: r=A log cos Bx; where r is the radial distance from said axis, x is the linear distance from the vertex of said function along said axis, A is a negative constant, and B is a constant such that $0 \leq Bx < \pi/2$ over the range of x.

* * * * *